United States Patent [19]

Delury

[11] 4,357,707
[45] Nov. 2, 1982

[54] DIGITAL PHASE LOCK LOOP FOR FLEXIBLE DISK DATA RECOVERY SYSTEM

[75] Inventor: Dale E. Delury, Irvine, Calif.

[73] Assignee: Pertec Computer Corporation, El Segundo, Calif.

[21] Appl. No.: 29,065

[22] Filed: Apr. 11, 1979

[51] Int. Cl.$^3$ ............................................ H03L 7/00
[52] U.S. Cl. .................................. 375/119; 375/110; 360/51; 307/269
[58] Field of Search ...................... 375/110, 119, 120; 370/100, 101, 111; 358/148, 264; 360/26, 36, 37, 38, 51, 40, 41, 42, 43, 44, 45; 307/269

[56] References Cited

U.S. PATENT DOCUMENTS

| | | | |
|---|---|---|---|
| 3,491,303 | 1/1970 | Gindi | 360/51 |
| 3,500,362 | 3/1970 | Schmitz | 360/51 |
| 3,684,967 | 8/1972 | Kelly | 307/269 |
| 3,810,234 | 5/1974 | Monett | 360/51 |
| 3,894,185 | 7/1975 | Vieri | 358/264 |
| 4,009,490 | 2/1977 | Fassbender | 360/51 |
| 4,017,803 | 4/1977 | Baker | 375/120 |
| 4,085,288 | 4/1978 | Viswanathan | 375/120 |
| 4,088,832 | 5/1978 | Eastmond | 375/110 |
| 4,163,946 | 8/1979 | Alberts | 307/269 |
| 4,180,701 | 12/1979 | Louth | 375/110 |
| 4,191,975 | 3/1980 | White | 358/264 |
| 4,218,771 | 8/1980 | Hogge | 375/120 |
| 4,231,071 | 10/1980 | Anderson | 360/40 |

Primary Examiner—Benedict V. Safourek
Assistant Examiner—Stephen Chin

Attorney, Agent, or Firm—Freilich, Hornbaker, Wasserman, Rosen & Fernandez

[57] ABSTRACT

A digital phase lock loop system used in conjunction with a flexible disk drive controller for recovering data information from either single density or double density serially encoded data. More specifically, a phase lock system is disclosed in which data bit windows and clock bit windows are defined by a plurality of phase clock cycles. A circuit is provided for determining during which phase clock cycle a bit occurs, an adjustment being made to the duration of its corresponding bit window and thus to the initiation time of a subsequent bit window which will tend to position the window so that it will be centered about its corresponding bit. In a specific embodiment for double density encoded data, a circuit is provided whereby the subsequent bit window is positioned in accordance with the position of the current bit within its corresponding window and the position of a preceding bit within its corresponding bit window. In addition, the invention provides a circuit whereby a position of each bit within its corresponding window is counted, the net count being indicative of the number of bits appearing in the second half of their corresponding bit windows less the number of bits appearing in the first half of their corresponding bit windows. A bias phase adjustment signal is generated for altering the duration of a bit window until the net count approaches zero. This altering provides for automatic compensation of variations in disk rotation speed and/or recording speed variations.

23 Claims, 5 Drawing Figures

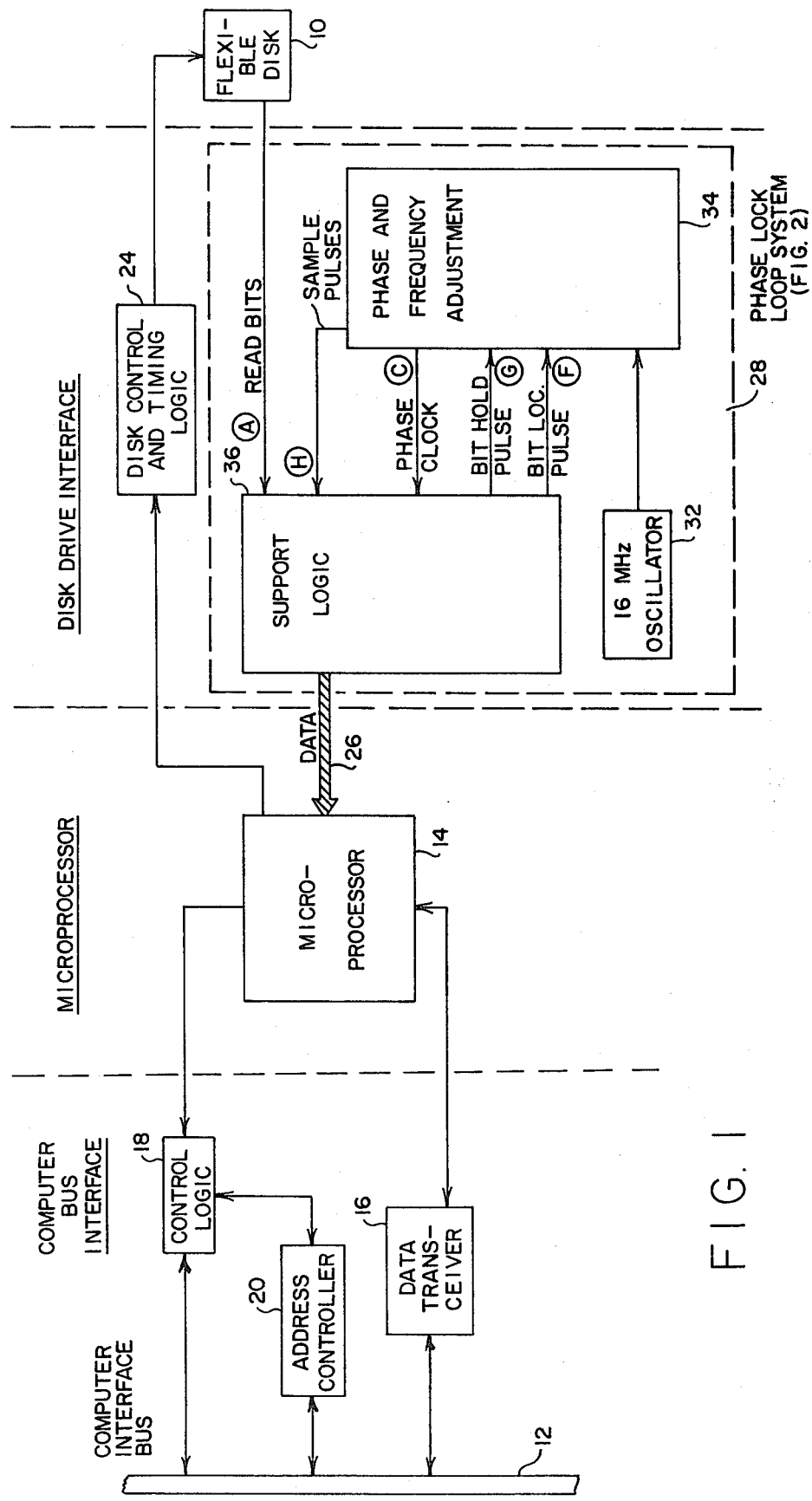

DIGITAL PHASE LOCK LOOP FOR FLEXIBLE DISK DATA RECOVERY SYSTEM

FIELD OF THE INVENTION

The invention relates to the digital phase lock loop art, and more particularly to a digital phase lock loop in which the duration of a synchronous signal with respect to an encoded bit stream can be varied in accordance with historical bit positional information.

BACKGROUND OF THE INVENTION

Both analog and digital phase lock loop circuitry are well known in the electronics art. Analog phase lock loops require frequent adjustment and calibration which are expensive in terms of both time and money. In addition, analog phase lock loops sometimes have stability problems. Attempts to minimize these problems have often resulted in an excessive cost for the phase lock loop portion of a circuit. In addition, many controllers for a flexible disk memory system are digital and require maintenance people having digital experience. A digital phase lock loop can capitalize on this digital experience and eliminate a need for maintenance people having analog circuitry expertise.

Conventional digital phase lock loop systems require the positioning of a fixed duration window about either data bits or clock bits. Positioning of such a window does not compensate for variations in flexible disk rotation rates, thereby resulting in a bit window having a duration which covers a variable percentage of the time interval allocated to each data or clock bit. In addition, conventional systems position a fixed duration window with respect only to the position of a single bit relative to its corresponding window. A disadvantage of this technique is the creation of a window having considerable jitter if pulses are almost centered but occur first on one side and then on the other side of a central position. The phase lock loop system of the present invention eliminates the above problems.

SUMMARY OF THE INVENTION

The present invention provides a means for generating a signal in phase lock with bits comprising an encoded bit stream having data and clock bits. A phase clock signal formed of a plurality of phase clock cycles or intervals is generated. Data bit windows and clock bit window each having a plurality of phase clock cycles are produced. A means for determining the position of a bit with respect to its corresponding bit window is provided and the initiation time of the next bit window is at least partially determined by this position. This initiation time is varied by altering the number of phase clock cycles in a bit window and/or the duration of a phase clock cycle within a bit window. In addition the invention provides a means whereby the duration of a bit window is determined as a function of the position of its bit and the preceding bit with respect to its corresponding bit window. By utilizing positional information from the two consecutive bits, the invention provides a means whereby window changes can be smoothly effected without being unreasonably affected by a single bit. This technique is especially useful in double density encoding where bit pairs are sometimes close together with respect to adjacent bits.

The invention also provides a means for continually adjusting the duration of data bit windows and clock bit windows as a function of the position of a large number of bits with respect to the center of their corresponding bit windows, the adjustments being made so that succeeding bits will tend to be centered within their respective bit windows. This adjustment is used to compensate for changes in disk rotation rates and/or recording speed variations.

Thus, the present invention discloses a means for adjusting a bit window duration, the adjustments being variable and dependent upon the position of a current bit with respect to its corresponding bit window and a preceding bit with respect to its corresponding bit window. In addition, a means is provided for an independent window adjustment which is utilized to compensate for rotation rate variations of the flexible disk.

BRIEF DESCRIPTION OF THE DRAWINGS

FIG. 1 is a block diagram of a data recovery system utilizing a phase lock loop according to the present invention;

DETAILED DESCRIPTION

Figure 2A:
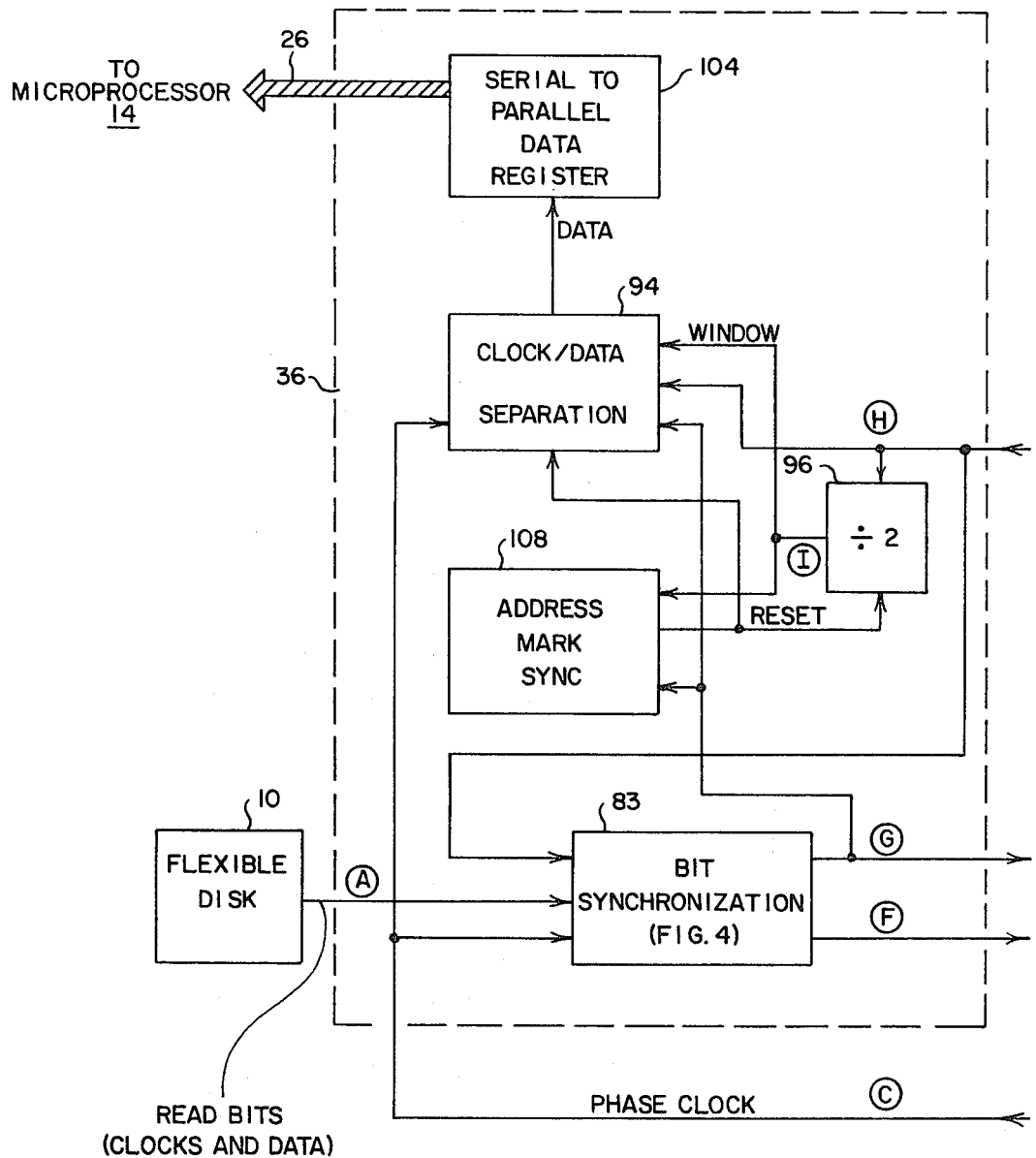
FIGS. 2a and 2b together comprise a block diagram of the phase lock loop system shown in FIG. 1.

As required, detailed illustrative embodiments of the invention are disclosed herein. These embodiments exemplify the invention and are currently considered to be the best embodiments for such purposes. However, it is to be recognized that other means for defining bit windows by adjustment of phase clock cycles could be utilized. Accordingly, the specific embodiments disclosed are representative in providing a basis for the claims which define the scope of the present invention.

As previously explained, the invention discloses a means for digitally generating bit windows in phase lock with bits comprising a coded bit stream having data bits and clock bits. A bit window is nominally defined by a predetermined plurality of phase clock cycles comprising a phase clock signal. However, a means is provided whereby the position of a bit within its corresponding bit window, and a position of a preceding bit within its corresponding bit window is used to alter both the number of and duration of phase clock cycles defining one bit window. This alteration compensates for bit position shifts in the encoded bit stream so that each window will tend to be symmetrically positioned about its corresponding bit, thereby maximizing the probability of the next bit occurring within its corresponding bit window. In addition, the invention discloses a frequency bias means whereby systematic shifts in each bit position with respect to its window can be compensated for by periodically altering both the duration and number of phase clock cycles which define each bit window. This frequency bias is utilized to compensate for changes in rotation rates and drive speeds sometimes associated with flexible disk memory systems.

Referring now to FIG. 1, a typical controller for interfacing a computer and a flexible disk memory system is shown. Although such a controller could be partitioned in many ways, a typical controller includes a computer bus interface section, a microprocessor section, and a disk drive interface section. In a specific embodiment, a data-containing flexible disk 10, and associated control and access hardware, is to be interfaced to a computer interface bus 12. A microprocessor 14 transmits and receives data from a computer via a data transceiver 16, the data transfer being controlled by a control logic circuit 18 in accordance with signals from an address controller 20. The microprocessor 14 provides control signals to a disk control and timing logic circuit 24 which in turn controls the positioning of read/write heads on the flexible disk 10. In a read-only system, data bits and clock bits are read serially from the flexible disk 10 and appropriately processed so that data bits can be provided to the microprocessor 14 via data lines 26. Data bits from the flexible disk 10 are identified and separated from clock bits by a phase lock loop system 28 provided by the invention.

The phase lock loop system 28 comprises three major sections, a 16 megahertz (MHz) square wave oscillator 32 section, a phase and frequency adjustment section 34, and a support logic section 36. An encoded bit stream of read bits which comprise data bits and clock bits are read from the flexible disk 10 and provided to the support logic section 36. Both data bit and clock bit windows are developed within the phase and frequency adjustment section 34, each window comprising a plurality of phase clock cycles the duration of which are related to the output of the 16 MHZ square wave oscillator 32. The support logic section 36 develops a pulse whose position is proportional to the position of a bit with respect to its window. This pulse is designated as a bit location pulse and is provided to the phase and frequency adjustment section 34. Based upon the position of the current bit with respect to its window, and the position of the preceding bit with respect to its corresponding window, the phase and frequency adjustment section 34 determines the adjustment to the current bit window so that a subsequent bit window will tend to be more centrally positioned with respect to an anticipated position of its associated bit. In addition, the phase and frequency adjustment section 34 provides a means to compensate for variations in the rotational speed of the flexible disk 10. Sample pulses are also provided by the phase and frequency adjustment section 34 to the support logic section 36, every other sample pulse defining the end of a data bit window. The support logic section 36 separates the data bits from the clock bits by positioning the data bit windows and clock bit windows so that the data bits and clock bits are located within their respective bit windows. The data bits are thus provided on the data output lines 26, this data output typically being provided in parallel format.

Figure 2B:
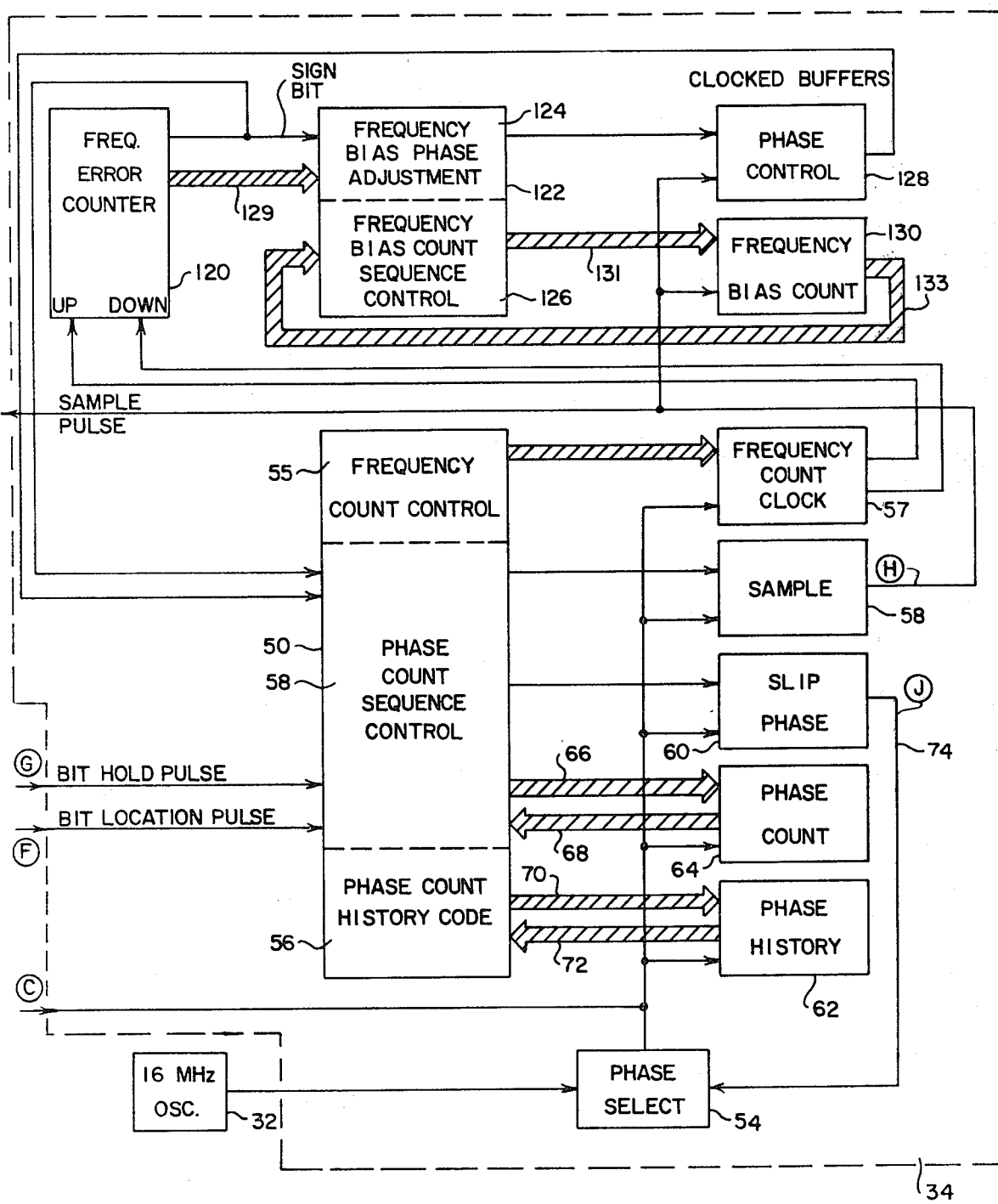
Figure 3:
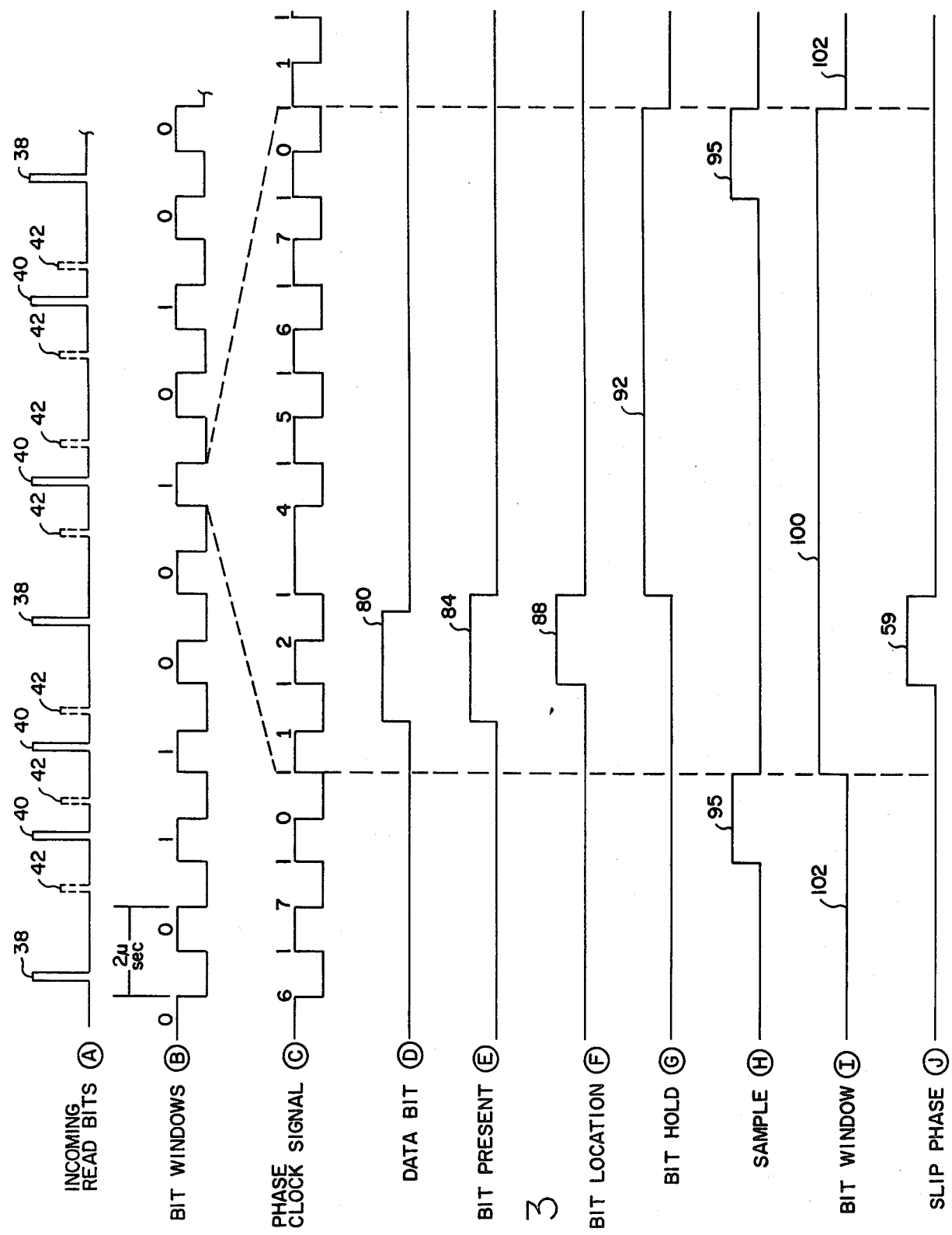
FIG. 3 shows a double density serially encoded bit stream and its relationship to the various waveforms used to control the phase lock loop of FIG. 2.

The phase lock loop system 28 is shown in more detail in FIG. 2. The invention is equally applicable to single density and double density encoding schemes. The specific embodiment shown in FIG. 2 is in relation to a double density encoding scheme commonly known as modified frequency modulation (MFM) which will be explained in detail below. Another encoding scheme known as modified, modified frequency modulation (M²FM) could also be utilized in conjunction with a phase lock loop according to the present invention. Referring to FIG. 3, waveform A represents an MFM encoded bit stream corresponding to a data bit pattern 0110010100. An MFM encoding scheme begins with a sequence of clock pulses which in this embodiment are nominally two microseconds apart. Data pulses are inserted midway between the clock pulses whenever a "1" is to be represented. If a "0" is to be represented, no pulse is inserted. Any of the clock pulses which has an adjacent data pulse, that is, any clock pulse which has a data pulse either preceding it or following it by one microsecond, is deleted. A bit stream encoded in accordance with the above comprises a sequence of pulses having each adjacent pulse separated by two, three or four microseconds. Referring now to waveform A in FIG. 3, clock pulses are represented as shown at 38 and data pulses are as shown at 40, each data pulse appearing between what would normally be two clock pulses. Then clock pulses having adjacent data pulses are deleted as shown in phantom at 42. Thus, an encoded bit stream has been created in which clock pulses are present, but in which every pulse is indicative of data information. The phase lock loop of the present invention provides a double density bit window nominally one microsecond in duration as shown in waveform B, the high portions of waveform B defining data bit windows and the low portions defining clock bit windows. Thus, if a "1" bit 40 occurs within a data bit window, a 1 will be transferred to the microprocessor 14, and if no pulse appears within a data bit window, a zero will be transferred. As one can appreciate, it is important that the window be located as precisely as possible with respect to an anticipated location of each data bit so that the 1's and 0's can be accurately identified. As will be explained, the invention provides a means to achieve this accurate positioning.

Referring again to FIG. 2, the output frequency from the 16 MHz square wave oscillator 32 is provided to a phase select circuit 54, the output of which is nominally an 8 MHz square wave, 8 cycles of which nominally equals one microsecond. The output of the phase select circuit 54 comprises a phase clock signal each cycle of which defines a phase clock cycle. Eight phase clock cycles define a double density data bit window and eight phase clock cycles define a double density clock bit window, each window being a nominal one microsecond in duration. The phase lock loop of the present invention provides a means whereby the data bit windows and clock bit windows can be positioned and adjusted with respect to their corresponding data and clock bits so as to maximize the probability of each bit occurring within its respective window.

Adjustment of the bit windows is effected by a phase adjustment read only memory (ROM) 50. A phase select circuit 54 receives as inputs the output from the 16 MHz square wave oscillator 32 and a slip phase signal 59 as shown in waveform J to be described below. In the absence of a slip phase signal, the frequency of the 16 MHz square wave is halved by the phase select circuit 54 to provide an 8 MHz square wave output defining the phase clock signal. When a slip phase signal is provided, one 16 MHz square wave cycle is skipped thereby increasing the duration of one phase clock cycle by the duration of one 16 MHz square wave cycle. Thus, a phase clock cycle occurring during a slip phase signal will have a duration 1.5 times that of nominal phase clock cycle. The output of the phase select circuit 54 comprises the phase clock signal utilized by the phase lock loop system 28.

The phase adjustment ROM 50 is divided into three memory sections, a frequency count control section 55, a phase count history code section 56 and a phase count sequence control section 58. The phase clock signal from the phase select circuit 54 is provided to clock five buffers associated with the phase adjustment ROM 50, the buffers being a frequency count buffer 57, a sample buffer 58, a slip phase buffer 60, a phase history buffer 62 and a phase count buffer 64. These buffers will be explained in detail below. As previously explained, a double density data or clock bit window is nominally one microsecond wide and nominally contains 8 phase clock cycles. Although this embodiment utilizes 8 phase clock cycles per window, it can be readily appreciated by one skilled in the art that any number of phase clock cycles could be utilized to define bit windows by varying the spacing between data and clock pulses, and varying the frequency of the square wave oscillator 32. The phase count sequence control section 58 of the phase adjustment ROM 50 assigns in accordance with other inputs to be explained below an initial identifier to a given phase clock cycle, for example "0". This "0" phase count is provided on phase count lines 66 and clocked into the phase count buffer 64 by the phase clock. The phase clock cycle "0" is transferred back to the phase count sequence control section 58 via transfer lines 68, the identifier in turn causing another memory cell within the phase adjustment ROM 50 to be addressed. Assuming for illustrative purposes that there is no data or clock bit being read from the flexible disk 10, the second memory cell to be addressed will contain a phase clock cycle identifier of "1", which in turn will be transferred via phase count line 66 to the phase count buffer 64 and clocked in to identify the next phase clock cycle. The phase adjustment ROM 50 is programmed so that in the absence of data bits, each phase clock cycle will be sequentially identified with an identifier between "0" and "7", the identification being made by a memory cell of the phase adjustment ROM 50 which is addressed in accordance with the output of the phase count buffer 64. However, as will be explained below, in the presence of other inputs, other ROM 50 memory cells may be addressed so that a phase count could be repeated or deleted, thereby altering the length of a data bit window or a clock bit window. Also, as one can appreciate, a repetition or deletion of a phase count in conjunction with a slip phase signal will allow a bit window to be adjusted in increments of one-half of a phase clock cycle. Thus, addressing of memory cells in the phase adjustment ROM 50 with respect to an upcoming phase count in conjunction with clocking of the phase count buffer 64 by the output of the phase select circuit 54 provides a means for effecting window adjustments in increments of 62.5 nanoseconds.

One of the inputs utilized to control addressing of the phase adjustment ROM 50 memory cells is the occurrence of the previous bit with respect to its corresponding bit window. This is an especially important aspect of the invention for double density encoding (MFM) in that one erratic bit could cause a subsequent bit window to be so misadjusted that it might miss a subsequent bit. Thus, each window adjustment is made according to both the position of the current bit and the position of the preceding bit so that each adjustment is related to the position of the two consecutive bits with respect to their corresponding windows. In a circuit to be explained below, the position of a bit with respect to a specific phase clock cycle occurring within its bit window is clocked from the phase adjustment ROM 50 to the phase history buffer 62 via bit history lines 70 by the phase clock signal from the phase select circuit 54. This information is transferred back to the phase adjustment ROM 50 via return lines 72 during the next clocking interval. The phase adjustment ROM 50 utilizes the outputs of the phase history buffer 62 and the phase count buffer 64 to determine the memory cell of the phase count sequence control section 58 to be addressed next, the addressed memory cell thus determining the next phase clock cycle identifier. Increasing the duration of a phase clock cycle is effected by a signal from the phase adjustment ROM 50 to the slip phase buffer 60. Thus, if the duration of a phase clock cycle is to be increased, a signal will be provided to the slip phase buffer 60 which in turn will be provided via a slip phase line 74 to the phase select circuit 54. This will result in the phase clock cycle occurring at the time of the slip phase signal to be increased by one-half of a phase clock cycle as previously explained. If a bit window is to be reduced by one-half cycle, the same slip phase signal is provided via the slip phase line 74 to the phase select circuit 54. However, in this case, the phase count sequence control section 58 skips one phase count, thereby reducing the number of phase clock cycles in the bit window by one. The net effect of the above is to reduce the duration of the bit window by 67.5 nanoseconds. Thus, it can be seen that both the number of phase clock cycles and the duration of a phase clock cyle within a bit window can be controlled. This control is effected by the position of a current bit with respect to its window, and the position of a preceding bit with respect to its window. These positions and the corresponding window adjustment are shown in Table I below.

TABLE I

Window Adjustments For MFM Encoded Data

PRECEDING BIT LOCATION PULSE AT PHASE COUNT
CURRENT BIT LOCATION PULSE AT PHASE COUNT
WINDOW ADJUSTMENT (nanoseconds)
+: Lengthen, −: Shorten

| Preceding | Current | Adjustment |
|---|---|---|
| 0 or 1 | 0 | −187.5 |
| 0 or 1 | 1 | −187.5 |
| 0 or 1 | 2 | −125.0 |
| 0 or 1 | 3 | −62.5 |
| 0 or 1 | 4 | −62.5 |
| 0 or 1 | 5 | −62.5 |
| 0 or 1 | 6 | 0 |
| 0 or 1 | 7 | +62.5 |
| 2 or 3 | 0 | −62.5 |
| 2 or 3 | 1 | 0 |
| 2 or 3 | 2 | −62.5 |
| 2 or 3 | 3 | 0 |
| 2 or 3 | 4 | 0 |
| 2 or 3 | 5 | +62.5 |
| 2 or 3 | 6 | +62.5 |
| 2 or 3 | 7 | +125.0 |
| 4 or 5 | 0 | 0 |
| 4 or 5 | 1 | 0 |
| 4 or 5 | 2 | −62.5 |
| 4 or 5 | 3 | 0 |
| 4 or 5 | 4 | 0 |
| 4 or 5 | 5 | +62.5 |
| 4 or 5 | 6 | +62.5 |
| 4 or 5 | 7 | +125.0 |
| 6 or 7 | 0 | −62.5 |
| 6 or 7 | 1 | 0 |
| 6 or 7 | 2 | 0 |
| 6 or 7 | 3 | 0 |
| 6 or 7 | 4 | +62.5 |
| 6 or 7 | 5 | +125.0 |
| 6 or 7 | 6 | +187.5 |
| 6 or 7 | 7 | +187.5 |

As an example, assume that the preceding bit location pulse (to be defined below) is at phase count "0" or "1" and the current bit location pulse is at phase count "0".

The phase count sequence control section 58 receives these two bit location inputs and addresses an appropriate memory cell within the phase adjustment ROM 50. This memory cell shows that for the above conditions the current bit window must be shortened by 187.5 nanoseconds, thereby causing the phase count sequence control section 58 to skip two phase counts and to generate a slip phase signal to increase one phase clock cycle by 62.5 nanoseconds. Thus, the identifier for the upcoming phase clock cycle will identify the cycle as phase count "3", thereby eliminating phase counts "1" and "2". However, due to the slip phase signal also supplied, the phase clock cycle identified by phase count "3" will be lengthened by 62.5 nanoseconds, thereby resulting in a net shortening of the bit window by 187.5 nonoseconds. As a second example, if the preceding bit location pulse occurs at phase count "6" or "7", and the current bit location pulse occurs at phase count "7", then the window adjustment table shows that the bit window should be increased by 187.5 nanoseconds. This increase is effected when the phase adjustment ROM 50 addresses a memory cell which causes the phase count "7" to be repeated and generates a slip phase signal. Thus, two phase counts have been identified as "7", the second one being 62.5 nanoseconds longer than the nominal 125 nanosecond phase clock cycle, thereby increasing the nominal duration of the bit window by 187.5 nanoseconds. As one can appreciate, any window adjustment table could be developed, and more than the preceding two bits could be considered in determining the appropriate window adjustment to be made.

Figure 4:
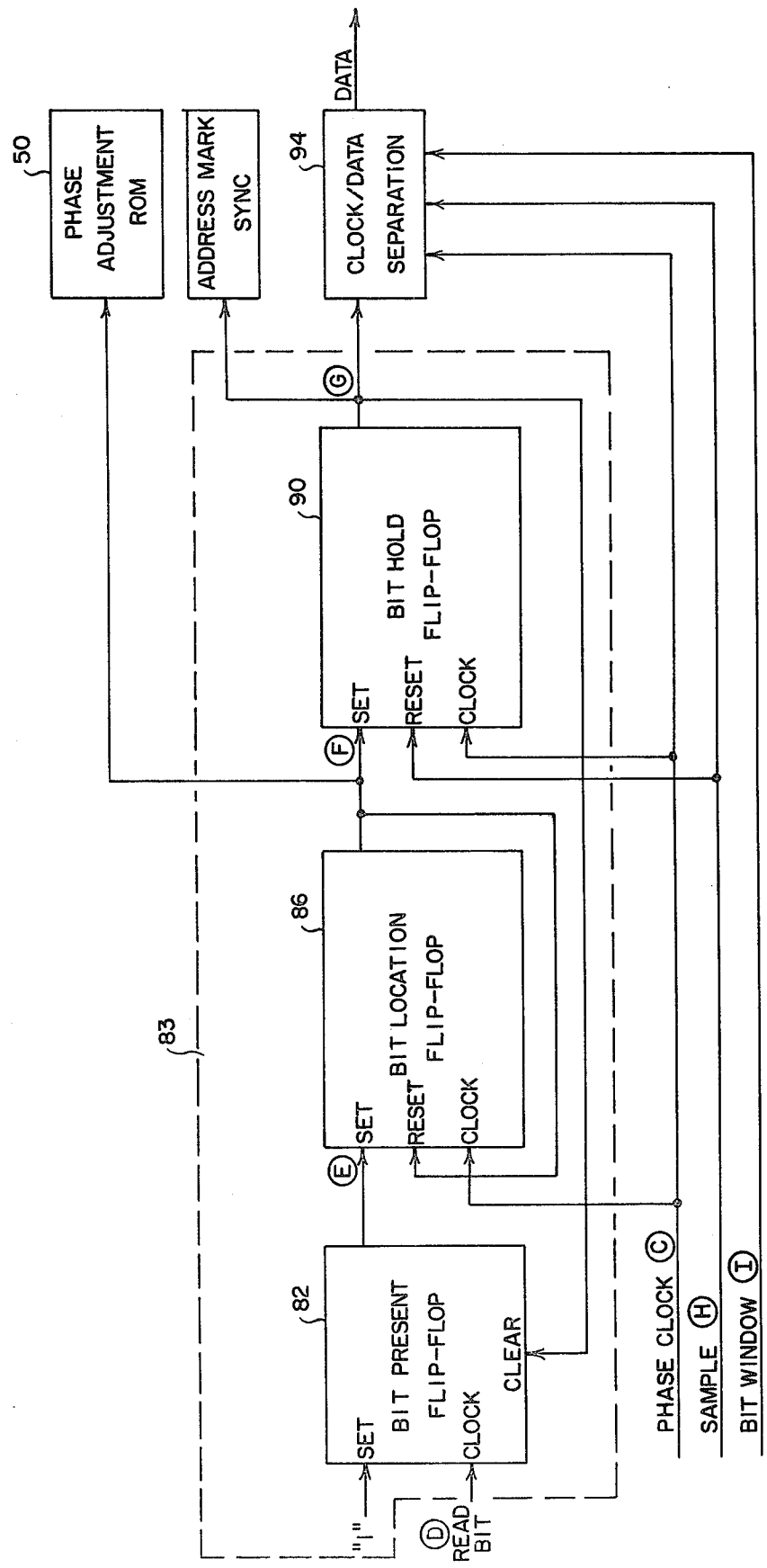
FIG. 4 is a block diagram of various flip-flops used to generate some of the control signals shown in FIG. 3.

At the end of each bit window, that is, at the phase clock cycle identified by phase count "0", a sample pulse is generated by the phase adjustment ROM 50 and provided to a sample buffer 58 which is clocked by the phase clock signal from the phase select circuit 54. The output from the sample buffer 58 is used to generate the data and clock bit windows as explained below. Generation of the control signals and location of the bits within their respective bit windows can best be understood by referring to FIG. 3 in conjunction with FIG. 4. As previously explained, an incoming bit stream defining a 0110010100 bit pattern encoded in MFM format is shown by waveform A. Expansion of a portion of waveform A showing the phase clock signal is shown in waveform C. Identifiers for each of the phase clock cycles are shown above waveform C. An incoming data bit 80 is shown in waveform D. The leading edge of the data bit 80 serves as the clock utilized to set a bit present flip-flop 82 in a bit synchronization circuit 83 shown in FIG. 4, the outut of which defines a bit present pulse 84 as shown in waveform E. The bit present pulse 84 is then clocked into a bit location flip-flop 86 by the phase clock signal. The output of the bit location flip-flop 86 is shown in waveform F of FIG. 4. It is this bit location pulse 88 which is used by the phase adjustment ROM 50 to determine the location of the data bit 80 with respect to a phase clock cycle within its corresponding data bit window. After one phase clock cycle the bit location pulse 88 is clocked into a bit hold flip-flop 90 by the phase clock signal and the bit location flip-flop 86 is reset by the same edge of the phase clock signal. The output of the bit hold flip-flop 90 defines a bit hold pulse 92 as shown in waveform G of FIG. 3. The bit hold pulse 92 is utilized to force the bit present flip-flop 82 to its reset state. The bit hold flip-flop 90 remains set until the trailing edge of a sample pulse 95 shown in waveform H. Assume as an example that the data bit 80 shown in waveform D in conjunction with the previous data bit indicates that a phase count adjustment of minus 62.5 nanoseconds should be made. Referring to the phase clock signal shown in waveform C of FIG. 3, it can be seen that phase count "3" is not present and that a slip phase signal was provided during phase count "2" thereby increasing the phase clock cycle identified by phase count "4" by 62.5 nanoseconds. The net effect of the above is to reduce the nominal one microsecond duration of the bit window by 62.5 nanoseconds.

The bit hold signal 92 is provided to a clock/data separation circuit 94 which operates as follows. Referring again to FIGS. 2 and 3, a sample pulse 95 from the sample buffer 58 is provided to the clock/data separation circuit 94 and to a divide-by-two circuit 96. The sample pulse 95 is generated by the phase adjustment ROM 50 each time that a phase clock cycle is identified as phase count "0". Thus, the time between sample pulses 95 is variable depending upon adjustments made to the nominal eight phase clock cycles defining a bit window. The outut of the divide-by-two circuit 96 shown as waveform I in FIG. 3 defines a data bit window 100 when in a high state and a clock bit window 102 when in a low state. The transition between the two states occurs at the trailing edge of each sample pulse 95. Within the clock/data separation circuit 94, circuitry is provided for the sample pulse 95 at the end of the data bit window 100 to cause the output of the bit hold flip-flop 90 to be sampled. If a bit hold pulse 92 is present, then a bit appeared during the data bit window 100. If a bit hold pulse 92 is not present, then no bit occurred during the data bit window thereby indicating a "0" data bit. The clock/data separation circuit 94 provides a serial data output to a serial-to-parallel data register 104 which in turn provides a parallel data output to the microprocessor 14.

The bit location pulse 88 which is supplied to the phase adjustment ROM 50 is used to identify the bit location with respect to a specific phase clock cycle. Clock and data bits are supplied from the flexible disk 10 to the bit synchronization circuit 83 which acts as a buffer and provides the bit hold pulse 92 to an address mark synchronization circuit 108. Many standard bit patterns can be utilized for initial synchronization and need not be described here as they are commonly known in the digital arts. The address mark synchronization circuit 108 examines the incoming bit stream for a predetermined pattern and provides a reset signal to the divide-by-two circuit 96 when any deviation from the predetermined pattern is detected, thus indicating that the search for the predetermined pattern will be retried. This reset signal is also provided to the clock-/data separation circuit 94.

Thus far, a phase lock loop has been described which generates and adjusts a bit window so that it will tend to be symmetrically positioned with respect to its corresponding bit, the exact positioning and adjustment being made in accordance with the window adjusments shown in Table I. The window adjustments, described by Table I, accommodate bit errors resulting from a flexible disk drive's electrical circuits and mechanical linkages. However, any deviation from the nominal line voltage frequency can sometimes result in considerable changes in the flexibe disk drive AC motor's rotation rate. It is desirable to compensate for the resulting bit rate error. This compensation can be characterized as a frequency bias adjustment which ensures that window durations continually correspond to changing rotation rates.

A system to effect this bias adjustment can be seen by again referring to FIG. 2. A frequency count clock buffer 57 is indexed by pulses generated by the frequency count control section 55 of the pulse adjustment ROM 50. The pulses are chosen so that if a bit appears in the first half of its corresponding bit window, a down-count signal is provided to the frequency count clock buffer 57, and if a bit appears in the second half of its bit window an up-count signal will be provided. These up and down counts are used to increment or decrement a frequency error counter 120. A frequency bias ROM 122 has two sections, a frequency bias phase adjustment section 124 and a frequency bias sequence control section 126. A phase control buffer 128 and a frequency bias count buffer 130 are also provided.

Bias adjustment is effected as follows. The frequency count control section 55 of the phase adjustment ROM 50 provides signals to the frequency count clock buffer 57 which are indicative of whether each bit occurred in the first half or the second half of its corresponding bit window. The output of the frequency count clock buffer 57 is provided to the frequency error counter 120 which outputs the net count of the number of bits occurring in the second half of their corresponding bit windows less the number of bits occurring in the first half of their corresponding bit windows. The net count is supplied to the frequency bias ROM 122 via frequency error count lines 129 and a sign bit indicative of whether a positive or negative total is present is also supplied. This bit sign is also provided to the phase adjustment ROM 50 for purposes to be explained below. The frequency bias ROM 122 is programmed to operate in accordance with Table II below.

TABLE II

Frequency Bias Adjustments.

| FREQUENCY ERROR COUNT | BIAS COUNT CYCLE |
|---|---|
| −2, −1, 0, +1 | (0 1 2 3 4 5 6 7) |
| −4, −3, +2, +3 | (0 1* 2 3 4 5 6 7) |
| −6, −5, +4, +5 | (0 1* 2 3 4 5) |
| −8, −7, +6, +7 | (0 1* 2 3) |
| −10, −9, +8, +9 | (0 1* 2) |
| −12, −11, +10, +11 | (0 1*) |
| −14, −13, +12, +13 | (0* 1* 2) |
| −16, −15, +14, +15 | (1*) |

NOTE:
Frequency bias adjustments are made at counts marked by asterisk.

Referring to Table II, a frequency error count from the frequency error counter 120 results in periodic 62.5 nanosecond adjustments to the bit windows, the frequency of phase adjustment being a function of the bias count cycle. One of the eight bias count cycles is active whenever data is being read from the flexible disk 10. The selection of the bias count cycle active at a particular time is effected by the frequency bias sequence control section 126 of the frequency bias ROM 122, and depends on the output of the frequency error counter 120 provided to the frequency bias ROM 122 via the frequency error count lines 129 and its sign bit line. Frequency bias count sequence control lines 131 are clocked from the frequency bias ROM 122 to the frequency bias count buffer 130 by the output of the sample buffer 58 occurring at the trailing edge of each bit window. This information is transferred back to the frequency bias ROM 122 via return lines 133 during the next bit window. The frequency bias ROM 122 utilizes the outputs of the frequency bias count buffer 130 and the outputs of the frequency error counter 120 to determine which bias count cycle is required and the sequence of bias counts. So long as the frequency error count is −2, −1, 0 or 30 1, bias adjustments are not made. The output of the frequency bias phase adjust section 124 of the frequency bias ROM 122 is clocked into the phase control buffer 128 by the output of the sample buffer 58 occurring at the trailing edge of each bit window. Referring to the second line of Table II, if the frequency error count is −4, −3, +2 or +3, the phase control buffer 128 is set during bias count cycle count "1". The output of the phase control buffer 128 and the frequency error counter 120 sign bit are provided to the phase adjustment ROM 50 to request a bias phase adjustment during this example's bias count cycle count "1." Thus a bias phase adjustment signal is provided once every eight counts. So long as the frequency error count is −2, −1, 0 or +1, bias adjustments are not made while this bias count cycle is in effect.

Continuing with another example assume that a frequency error count of six and a negative sign are provided to the frequency bias ROM 122. Having this input, the frequency bias ROM 122 is programmed so that the "6" and "7" bias count cycle counts are skipped and a "0" count is provided after a "5" count is reached. In addition, the frequency bias ROM 122 is programmed so that a frequency bias phase adjustment signal is provided to set the phase control buffer 128 during bias count cycle count "1". The output of the phase control buffer 128 provided to the phase adjustment ROM 50 in conjunction with the sign information from the frequency error counter 120 is used by the phase adjustment ROM 50 to provide a signal to the slip phase buffer 60. Phase clock cycle identification by the phase count sequence control section 58 is controlled by the sign bit provided by the frequency error counter 120 so that either a phase count can be skipped or not depending on the type of adjustment required. By way of further example, assume that the frequency error count is either −12, −11, +10, or +11. In this case, the bias count cycle consists of only two counts, "0" and "1". Thus, at every other count a phase adjustment signal is provided, this adjustment thereby affecting every other bit window. The phase adjustment ROM 50 is programmed so that the bias phase adjustments occur in conjunction with and without affecting any other phase adjustments.

In another embodiment of the invention, a single density encoding scheme, commonly known as Frequency Modulation (FM), is accommodated. An FM encoding scheme begins with a sequence of clock pulses which in this embodiment are nominally four microseconds apart. Data pulses are inserted midway between the clock pulses whenever a "1" is to be represented. If a "0" is to be represented, no pulse is inserted. This embodiment does not require the phase count history code section 56 of the phase adjustment ROM 50 because the isolated bit pair problem previously described does not appear. Thus, each window adjustment is based only upon the position of its corresponding bit. In this example of single density encoded data, each bit window would nominally be two microseconds wide, thereby requiring 16 phase clock cycles to define a bit window. In this embodiment, the adjustments made to the bit windows would be in accordance with Table III below:

TABLE III

Window Adjustments For Single Density Encoded Data

CURRENT BIT LOCATION PULSE AT PHASE COUNT
WINDOW ADJUSTMENT (nanoseconds)
    +: Length, −: Shorten

| | |
|---|---|
| 0 | −187.5 |
| 1 | −187.5 |
| 2 | −125.0 |
| 3 | −125.0 |
| 4 | −62.5 |
| 5 | −62.5 |
| 6 | −62.5 |
| 7 | 0 |
| 8 | 0 |
| 9 | +62.5 |
| 10 | +62.5 |
| 11 | +62.5 |
| 12 | +125.0 |
| 13 | +125.0 |
| 14 | +187.5 |
| 15 | +187.5 |

Thus, if a bit location pulse occurred during the phase clock cycle identified by phase count "0", phase counts "1" and "2" would be dropped from the current bit window phase count and a slip phase signal would be provided, thereby resulting in a shortening of the bit window by 187.5 nanoseconds. In a similar manner, if a bit location pulse occurred during phase count "14", then phase count "14" would be repeated and a slip phase signal would be provided, thereby resulting in an increase in the bit window duration of 187.5 nanoseconds. The frequency bias adjustments described for the double density embodiment are also utilized by the single density embodiment.

Thus, a digital phase lock loop has been described in which the positioning of a bit window is controlled by the position of a current bit with respect to its corresponding bit window and the position of a preceding bit with respect to its corresponding bit window. In addition, a means has been described for adjusting the duration of data bit and clock bit windows as a function of the position of each bit within its corresponding window so that each bit will tend to be centered within its bit window regardless of rotation variations of the flexible disk being read or rotation variations of the flexible disk durng data recording. Although the phase lock loop of the present invention has been described in conjunction with a flexible disk data recovery system, it should be understood that the digital phase lock loop could be utilized in many other applications, and is in no way limited to use in a flexible disk data recovery system.

What is claimed is:

1. A system for generating a signal in phase lock with data bits within an encoded bit stream having data bits and clock bits, comprising:
    means for providing a phase clock signal formed of a sequence of phase clock cycles;
    means for assigning a discrete phase count from within the range O-N of positive integers to each phase clock cycle;
    means responsive to said phase clock signal for producing a sequence of bit windows, each corresponding with a bit in said bit stream, each bit window having a variable duration during which a plurality of phase clock cycles occur;
    each bit window duration being initiated responsive to the occurrence of a phase clock cycle assigned a second discrete phase count;
    means for determining the position of a bit in said bit stream with respect to the phase clock cycles within the bit window corresponding therewith; and
    means for selectively varying the number of phase clock cycles occurring during a bit window duration responsive to the position within said bit window of the bit corresponding therewith.

2. The system of claim 1 wherein said bit windows comprise alternating data bit windows and clock bit windows.

3. The system of claim 1 in which a nominal bit window is defined by a predetermined plurality of phase clock cycles and including means responsive to the positions of selected bits within their respective corresponding bit windows for lengthing or shortening said nominal bit window by multiples of one-half of a phase clock cycle.

4. The system of claim 1 further including means for varying the duration of said phase clock cycles occuring during the duration of a bit window responsive to the position within said bit window of the bit corresponding therewith.

5. The system of claim 4 wherein said means for varying the duration of said phase clock cycles defining a bit window comprises means for varying the duration of said phase clock cycles responsive to the positions within their respective bit windows of two selected bits in said bit stream.

6. The system of claim 1 wherein said means for selectively varying the number of phase clock cycles occurring during the duration of a bit window comprises means for varying the number of said phase clock cycles responsive to the positions within their respective bit windows of two selected bits in said bit stream.

7. In combination with a flexible disk data recovery system wherein an encoded bit stream having data bits and clock bits is obtained from a flexible disk, a means for generating a signal in phase lock with said data bits, comprising:
    means for providing a phase clock signal formed of a sequence of phase clock cycles;
    means responsive to said phase clock signal for producing a bit window to correspond with each bit in said bit stream;
    each of said bit windows having a variable duration defined by a plurality of said phase clock cycles;
    means for providing a signal indicative of the position of a selected bit with respect to the phase clock cycles within the bit window corresponding therewith; and
    means for selectively varying the number of phase clock cycles defining a bit window responsive to the position within said bit window of the bit corresponding therewith.

8. The system of claim 7 further including means for varying the duration of said phase clock cycles defining a bit window responsive to the position within said bit window of the bit corresponding therewith.

9. The system of claim 8 wherein said means for selectively varying the duration of said phase clock cycles defining a bit window comprises means for varying the duration of said phase clock cycles responsive to the positions within their respective bit windows of two selected bits in said bit stream.

10. The system of claim 7 wherein said means for selectively varying the number of phase clock cycles defining a bit window comprises means for varying the number of said phase clock cycles responsive to the positions within their respective bit windows of two selected bits in said bit stream.

11. A system for generating a signal in phase lock with data bits within an encoded bit stream having data bits and clock bits comprising:
means for providing a phase clock signal formed of a sequence of phase clock cycles;
means responsive to said phase clock signal for providing a bit window to correspond with each bit in said bit stream;
each of said bit windows having a variable duration defined by a plurality of said phase clock cycles;
means for providing a signal indicative of the position of a selected bit with respect to the phase clock cycles within the bit window corresponding therewith; and
means for selectively varying the duration of phase clock cycles defining a bit window responsive to the position within the bit window of the bit corresponding therewith.

12. The system of claim 11 wherein said means for providing a signal indicative of the position of a selected bit with respect to the phase clock cycles within the bit window corresponding therewith includes means for identifying a phase clock cycle essentially coincident with said bit.

13. A method of generating a signal in phase lock with bits within an encoded bit stream having data bits and clock bits, comprising the steps of:
providing a phase clock signal formed of a sequence of phase clock cycles;
producing a bit window to correspond with each bit in said bit stream;
each of said bit windows having a variable duration defined by a plurality of said phase clock cycles;
determining the position of a bit in said bit stream with respect to the phase clock cycles within the bit window corresponding therewith; and
selectively varying the number of phase clock cycles defining a bit window responsive to the position within said bit window of the bit corresponding therewith.

14. The method of claim 13 wherein said step of selectively varying the number of phase clock cycles defining a bit window comprises the step of varying the number of said phase clock cycles responsive to the positions within their respective bit windows of two selected bits in said bit stream.

15. The method of claim 13 further comprising the step of tending to center each bit window abouts its corresponding bit.

16. In combination with a data source providing a stream of bits, means for generating a signal comprised of bit windows occurring in synchronism with said bits, said signal generating means comprising:
means for producing a first signal comprising successive transitions to define successive bit windows each having a duration defined by the interval between successive transitions;
means for producing a second signal indicative of the interval between the occurrence time of each transition initiating a bit window and the occurrence time of a bit within that same bit window; and
means responsive to said second signal for adjusting the duration of that same bit window.

17. The combination of claim 16 wherein said adjusting means includes means for selecting the occurrence time of the transition succeeding said transition initiating said same bit window.

18. In a system for obtaining data bits from an encoded bit stream containing data bits and clock bits, the improvement comprising:
means for providing a phase clock signal formed of a sequence of ordered phase clock cycles;
means responsive to said phase clock signal for defining nominal bit windows, each being defined by a predetermined plurality of said phase clock cycles and each corresponding with a different one of said data and clock bits;
means for determining the position of a selected bit within its corresponding bit window by identifying the order of a phase clock cycle essentially coincident therewith; and
means for adjusting the initiation time of a bit window responsive to the positions of two preceding bits within their respective bit windows.

19. The system of claim 18 further comprising means responsive to the positions of selected bits within their respective corresponding bit windows for substantially centering said bit windows about their corresponding bits.

20. The system of claim 19 wherein said means for substantially centering comprises means for altering the duration of a bit window in accordance with a predetermined frequency bias adjustment table and further comprising;
a frequency error counter;
means for decrementing said frequency error counter when a bit is in a first position within its corresponding bit window and for incrementing said counter when a bit is in a second position within its corresponding bit window;
a bias memory having a plurality of bias memory locations each of which stores an entry of said frequency bias adjustment table;
means for accessing said bias memory locations in accordance with the count in said frequency error counter;
means responsive to the count in said frequency error counter for generating bias phase adjustment signals having a frequency of occurence determined by said frequency bias adjustment table; and
means responsive to said bias phase adjustment signals for adjusting the duration of bit windows occurring concurrent with said bias phase adjustment signals by multiples of one-half of a phase clock cycle.

21. The system of claim 20 wherein said means for adjusting the duration of bit windows comprises:
a control memory having a plurality of control memory locations accessable by said phase adjustment signals, each of said control memory locations storing a duration control instruction for controlling the duration of a bit window;
means for selectively varying the number of phase clock cycles defining a bit window in accordance with selected duration control instructions; and
means for altering the duration of selected phase clock cycles in accordance with selected duration control instructions.

22. The system of claim 18 wherein said means for adjusting comprises means for altering the duration of a bit window in accordance with a predetermined first bit window alteration table.

23. The system of claim 22 wherein said means for altering comprises:
  means for storing phase count information identifying the positions of two selected bits with respect to the initiation time of their respective bit windows;
  a plurality of control memory locations, each of which contains an entry of said bit window alteration table;
  means for accessing said plurality of control memory locations in accordance with said phase count information; and
  means for changing the phase of said phase clock signal at the end of a phase clock cycle responsive to said entries accessed from said control memory locations.

* * * * *